United States Patent [19]

Pham Van Cang

[11] Patent Number: 4,538,268

[45] Date of Patent: Aug. 27, 1985

[54] TEST-SIGNAL GENERATING DEVICE FOR TESTING ELECTRONIC EQUIPMENT

[75] Inventor: Luc Pham Van Cang, Paris, France

[73] Assignee: Thomson-CSF, Paris, France

[21] Appl. No.: 476,021

[22] Filed: Mar. 16, 1983

[30] Foreign Application Priority Data

Mar. 19, 1982 [FR] France ................. 82 04752

[51] Int. Cl.³ ............................................ G01R 31/28
[52] U.S. Cl. ...................................... 371/20; 358/10;
364/579; 371/27
[58] Field of Search ..................... 371/20, 29, 27;
324/73 R, 73 AT; 364/579, 580, 550, 551;
358/10, 139

[56] References Cited

U.S. PATENT DOCUMENTS

| | | | |
|---|---|---|---|
| 4,055,801 | 10/1977 | Pike et al. | 324/73 R |
| 4,168,527 | 9/1979 | Winkler | 364/580 |
| 4,215,367 | 7/1980 | Schaffer et al. | 358/139 |
| 4,240,100 | 12/1980 | Gorbold et al. | 358/10 |
| 4,268,851 | 5/1981 | Heller et al. | 358/10 |
| 4,389,710 | 6/1983 | Rasmussen | 364/551 |
| 4,417,336 | 11/1983 | Weilbacker | 371/20 |

OTHER PUBLICATIONS

Akiyama et al., Digital VITS Generator for Television Broadcasting, N.E.C. Research and Development, No. 63, Oct. 1981, Tokyo (JP).

Burkies et al., Digital Generation of Test Signals for Colour Television, IEEE Transactions on Broadcasting, vol. BC-26, No. 3, Sep. 1980, New York (US), pp. 82-90.

*Primary Examiner*—Charles E. Atkinson
*Attorney, Agent, or Firm*—Oblon, Fisher, Spivak, McClelland & Maier

[57] ABSTRACT

A generating device comprising means for storing test signals in the form of digital samples coupled to a digital-to-analog converter for converting the samples to analog signals at the output of the device. A read/write memory is interposed between the digital-to-analog converter and the storage means. A computer is coupled to the storage means and to the read/write memory. The computer comprises means for generating test signals in the form of digital samples, means whereby the samples stored within the storage means and the test signals produced by the generating means are transferred into the read/write memory as well as means for synchronizing the transfer of samples stored within the read/write memory to the digital-to-analog converter.

10 Claims, 8 Drawing Figures

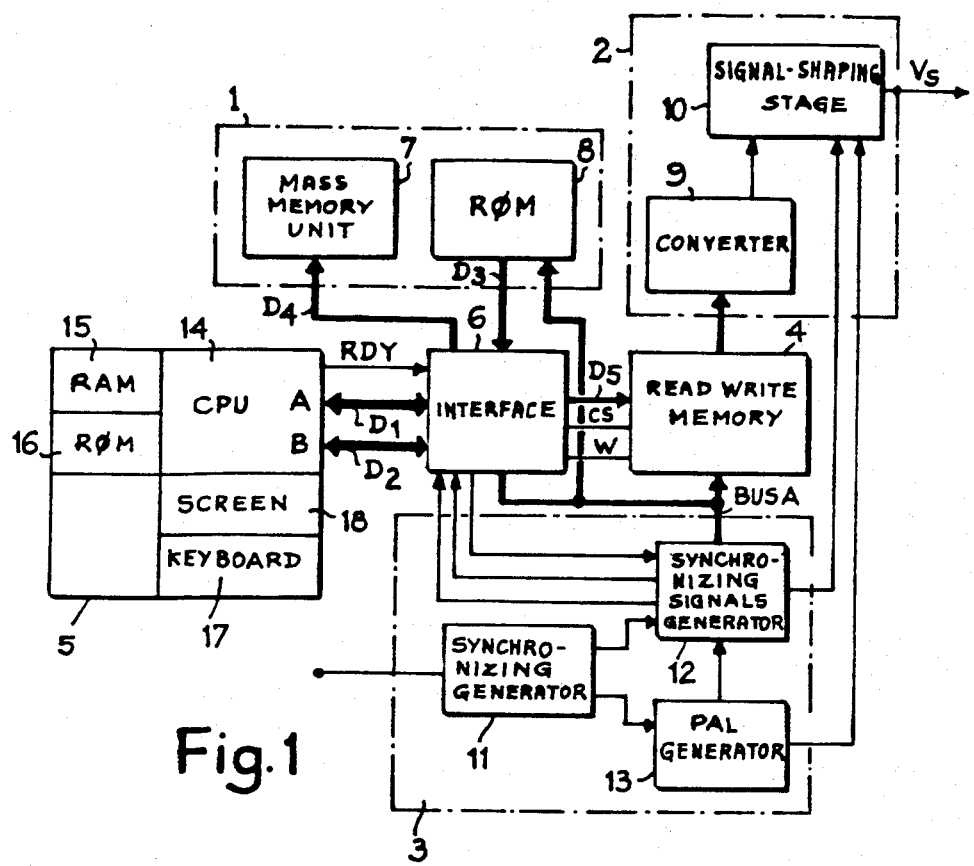

TEST-SIGNAL GENERATING DEVICE FOR TESTING ELECTRONIC EQUIPMENT

BACKGROUND OF THE INVENTION

This invention relates to a test-signal generating device for testing electronic equipment and especially television equipment.

Test-signal generators are already known, specifically in the television field for controlling the operation of television transmitter-receivers. Generators of this type produce the majority of signals required for ordinary tests and a certain number of test signals are defined by international standards in order to facilitate the signal characterization operations or long-distance maintenance of television transmitter-receivers. Certain signals are inserted in the television image at lines which are well-determined by an international standard and are thus made invisible on the screens of television receivers. In this manner, testing and measuring operations remain entirely transparent for the user. Most of these generators are constructed in accordance with conventional analog techniques of signal formation.

In another known category are the digital or numerical signal generators, the function of which is to deliver a sequence of numerical values or samples describing the television test signal. This sequence is stored in a read-only memory (ROM) and is read at a suitable rate to be subsequently converted by a digital-to-analog converter which regenerates the desired television signal. The digital technique employed for delivering television test signals has a well-established reputation for providing reliable signals of good quality if the signals consist of a large number of samples per line and if each sample consists of a sufficient number of bits. A further advantage of the digital technique lies in the fact that it is also possible to obtain composite signals by selecting and combining different memories.

A problem arises, however, if it is desired to obtain a very wide variety of signals for digital test-signal generators. Inasmuch as a signal delivered by a conventional generator in the black and white mode, for example, requires between 1600 and 2048 eight-bit samples per scanning line in order to regenerate said signal, it is necessary to have a large capacity of read-only memories (ROMs) in order to obtain a large number of test signals. This capacity may amount to N.16 kilobits, where N represents the number of test signals stored in memory in the form of samples. Said capacity is appreciably increased in the case of color television signal generators in which the luminance signals require samples of at least ten bits and in which the chrominance samples (which are four times smaller in number than the luminance signals) require at least eight bits. In consequence, the capacity of the ROMs required in order to provide a sampled test-signal generator of the prior art increases and very rapidly exceeds reasonable limits when the number of test signals required attains only a few tens of signals.

Furthermore, the configuration of the test signals remains frozen in the ROM, with the result that it is impossible during a test to vary the signals or even to generate other signals which might seem to the operator to be better suited for the diagnosis obtained from the television equipment under test.

SUMMARY OF THE INVENTION

The object of the invention is to overcome the disadvantages mentioned above by means of a device for generating test signals which offers greater flexibility of use than the devices of the prior art and makes it possible to generate a large number of different test signals according to the operator's requirements.

To this end, the invention is directed to a test-signal generating device for testing electronic equipment and comprising means for storing test signals in the form of digital samples coupled to a digital-to-analog converter for converting the samples stored in digital form to analog signals at the output of the device. The distinctive feature of said device lies in the fact that it comprises:
 a read/write memory interposed between the analog-to-digital converter and the storage means;
 a computer coupled to the storage means and to the read/write memory and comprising:
  means for generating test signals in the form of digital samples;
  means for transferring into the read/write memory the signals stored within the memory or storage means and the test signals produced by the generating means;
  as well as means for synchronizing the transfer of samples stored within the read/write memory to the digital-to-analog converter.

According to another distinctive feature of the invention, the means for generating test signals consist of a microprogrammed processing unit comprising a central processing unit coupled with means for storing signal descriptors and also coupled with means for storing instruction sequences each constituting a particular program of generation of an elementary test signal. By virtue of this arrangement, all the resources which are necessary for generating a test signal are identifiable by means of signal descriptors which can be addressed directly by means of a keyboard, for example, which is connected to the processing unit. Since each descriptor contains in particular the address of the start of an elementary test-signal generation program, the operator can produce direct action by means of the keyboard, for example, or any other access means in order to initiate the programs corresponding to the type of test signal which he desires to obtain.

This arrangement is particularly advantageous since it permits the generation of a large number of test signals each composed of an association of a number of elementary signals which can be generated successively in time. This generation of signals takes place as a direct result of selection by the operator of the different descriptors which he requires in order to compose his signal.

Another advantage of the device according to the invention lies in the fact that, each time a further test signal is generated, the device makes it possible to enrich the library of test signals already contained in the storage means since the storage operation is performed simply by transferring generated samples from the processing unit to the storage means.

Moreover, the fact that the device includes a read/write memory through which all the digital samples are transferred and directed to the analog-to-digital decoder makes it possible to match the flow rates of data derived either from the computer or from the storage means for the purpose of regenerating analog test signals corresponding to television standards by making use of synchronization means.

BRIEF DESCRIPTION OF THE DRAWINGS

Other features of the invention will be more apparent upon consideration of the following description and accompanying drawings, wherein:

FIG. 1 is a block diagram of the device in accordance with the invention for generating television test signals;

FIG. 2 is a schematic diagram of a signal descriptor;

DETAILED DESCRIPTION OF THE INVENTION

Figure 3:
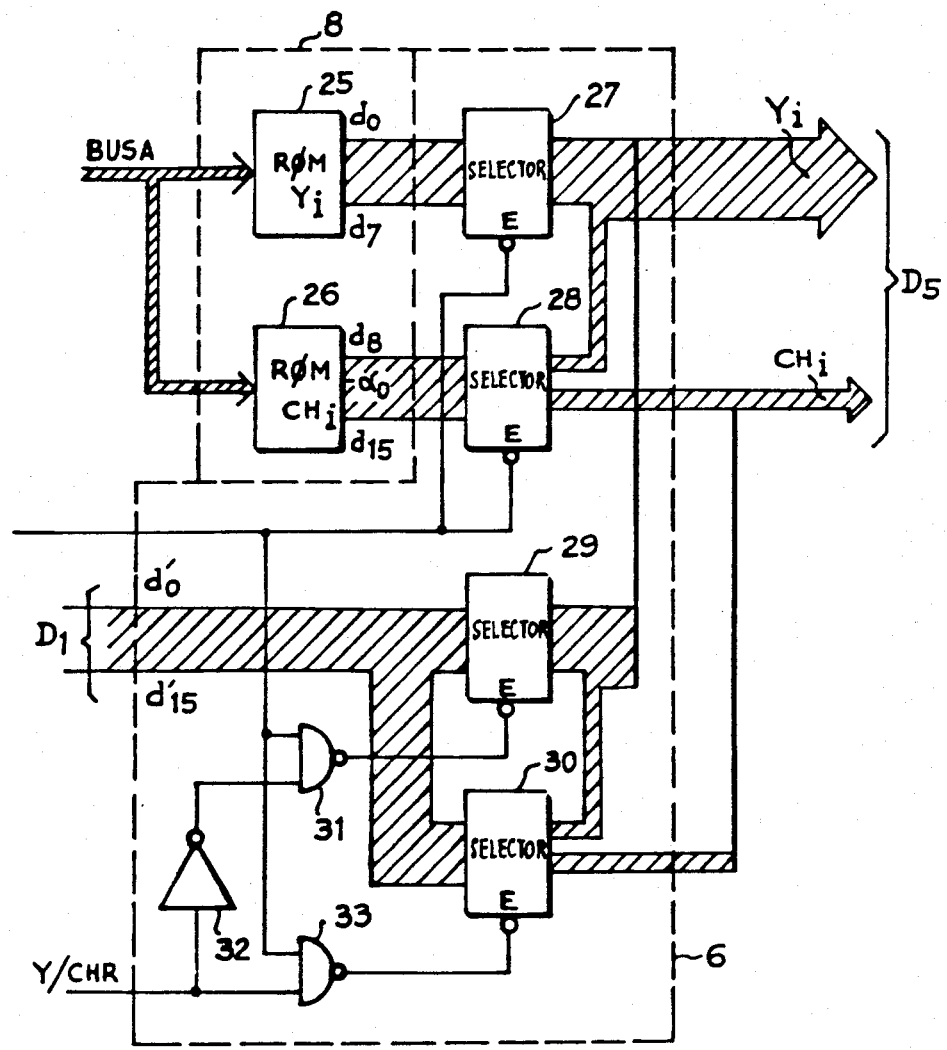
FIG. 3 is a schematic diagram of the read-only memories (ROMs) comprising storage means and their associated circuits.

The device illustrated in FIG. 1 comprises storage means 1, an analog-to-digital converter 2, synchronization means 3, a read/write memory 4 and a computer 5. An interface 6 provides the connections between the storage means 1 and the read/write memory 4; said interface is controlled by the computer 5. By means of its gates A and B, the computer 5 is connected to the interface 6 respectively via the data line D1 and the data destination control line D2. Data transfer takes place between the storage means 1 and the interface 6 via the data lines D3 and D4. Said data pass out of the interface 6 and are transferred to the read/write memory 4 via the data line D5.

The storage means 1 comprise a mass memory unit 7 and a ROM memory 8. The mass memory unit 7 is a very-high-capacity memory containing the test signal library of the device and can consist of a disk memory or floppy disk. The transfer of signals between the mass memory unit 7 and the interface 6 takes place on the data line D4 under the control of the computer 5. The ROM memory 8 contains a set of preprogrammed test signals. Provision need be made for a set consisting only of a very small number of signals, namely those signals which are the most commonly employed for testing television equipment, in order to carry out rapid tests without making use of the test signal library contained in the mass memory unit 7.

The analog-to-digital converter 2 comprises a converter 9 whose inputs receive the digital signal which is read in the memory 4 and whose output delivers an analog signal to be transferred to a signal-shaping stage 10.

The synchronization means 3 are constituted by a synchronizing generator 11, a device 12 for generating synchronizing ("sync") signals and by a device 13 or so-called "PAL" generator for generating PAL-system synchronizing signals, said signals being directed to the shaping stage 10.

The read/write memory 4 consists of a volatile memory of the random-access type (RAM).

The read/write memory 4 as well as the ROM memory 8 are addressed by a common address bus (A/BUS) in which are transferred addresses derived from the synchronization system 3 or from the computer 5 via the interface 6.

The computer 5 has a microcomputer structure and is accordingly constituted in known manner by a central processing unit (CPU) 14 consisting, for example, of a microprocessor interconnected via its data and address buses to a central RAM memory 15, at least one ROM memory 16 a key board 17 and a screen 18. For more details on the subject of microcomputer fabrication, reference may usefully by made to the book entitled "Microprocesseurs et microordinateurs" ("Microprocessors and microcomputers") by R. Lyon Caen and J-M. Crozet published by Masson, Paris, 1977 or to the book entitled "Minicomputer systems" by Cay Weitzman published by Prentice Hall Inc. New York, 1974. The ROM memory 16 contains all the tables and microprograms which are necessary for carrying out transfers of information or data between the storage means 1 and the read/write memory 4 as well as those which are necessary for generating further test signals. These transfer operations are carried out and controlled by performing input-output instructions. The execution of such instructions is usually indicated in the technical specifications of microprocessors which are currently available and consequently do not need to be described in order to gain an understanding of the invention. The tables employed for generating the test signals are constituted by areas of the ROM memory 16 which contain the signal descriptors.

The format of a signal descriptor is shown in FIG. 2. In this figure, the descriptor 19 is constituted by the areas 20 to 24 bis. The area 20 stores the type of descriptor and serves to identify the descriptor when it is selected by the operator on a keyboard. The area 21 contains the starting address of the program of generation of test signals corresponding to the descriptor, this program being stored within the ROM memory 16. The area 22 specifies the address $AZ_1$ of one area of the central memory 15 in which is stored the amplitude of the first sample of the signal corresponding to the descriptor and which is utilized for storing the following samples of the signal. The area 23 specifies the address $AZ_2$ of one area of the central memory 15 in which the instant of start of the signal is stored. The area 24 specifies the address $AZ_3$ of one area of the central memory 15 in which the amplitude of the end of the signal is stored. The area 24 bis specifies the address $AZ_4$ of one area of the central memory 15 in which the instant marking the end of the signal is stored. The address areas $AZ_1$ to $AZ_4$ of the central memory are written from the keyboard 17 once the operator has selected the descriptor.

The connections of the ROM memory 8 as well as the connections of the computer 5 with the read/write memory 4 are shown in FIG. 3. In this figure, the ROM memory 8 is constituted by two memory blocks 25 and 26. The memory 25 contains samples $Y_i$ of the luminance signals and the memory 26 contains samples $CH_i$ of the chrominance signals. A construction layout for memories of this type could be realized, for example, by means of two ROMs each having a capacity of thirty-two kilobits (type No 2732 marketed by the Motorola Corporation), which corresponds to a capacity of 4 K words of sixteen bits which is thus capable of collecting two test signals each having 2048 samples. In accordance with this organization, one sixteen-bit word read in the memory 8 is placed at the outputs d0 to d15 of the memory 8; the outputs d0 to d9 transmit the luminance bits, the outputs d10 to d13 transmit the chrominance bits and the output d15 transmits a control bit. The outputs d0 to d7 of the memory 25 are connected to the respective inputs of a selector 27 and the outputs d8 to d15 of the memory 26 are connected to the respective inputs of a selector 28. The selectors 27 and 28 transmit respectively the bits of the luminance samples $Y_i$ which appear at the outputs d0 to d7 and the bits of the chrominance samples $CH_i$ which appear at the outputs d8 to d13 of the memories 25 and 26 on the data line D5 when they are controlled at their input E.

The data $d'_0$ to $d'_{15}$ derived from the computer via the data line D1 are applied to the respective inputs of the selectors 29 and 30. These data are transmitted via the outputs of the selectors 29 and 30 to the data line D5 when the inputs E of the selectors 29 and 30 are validated. Validation of the inputs E of the selectors 27 to 30 is carried out as follows. The selectors 27 and 28 are activated when the device is synchronized by external clock signals produced, for example, by a television transmitter station. The selectors 29 and 30 are activated when the device is not connected to a station and when said device operates in the internal mode on an internal clock. The input E of the selector 29 is applied to the output of the NAND-gate 31 having two inputs : one input receives an internal-external control signal INT/EXT derived from the synchronization means 3 and the other input is connected to the output of the inverting amplifier 32 which receives on one input a signal Y/CHR, said signal being also derived from the synchronization means 3. The input E of the selector 30 is connected to the output of the NAND-gate 33 having two inputs : one input receives the internal-external signal and the other input receives the signal Y/CHR. When it is in a first state, the signal Y/CHR initiates the selection, by means of the selector 29, of the samples $Y_i$ of the luminance signals placed on the lines $d'_0$ to $d'_7$ of the data line $D_1$. When said signal Y/CHR is in a second state, it initiates the selection, by means of the selector 30, of the samples $CH_i$ of the chrominance signals placed on the lines $d'_8$ to $d'_{13}$ of the data line $D_1$.

Figure 4:
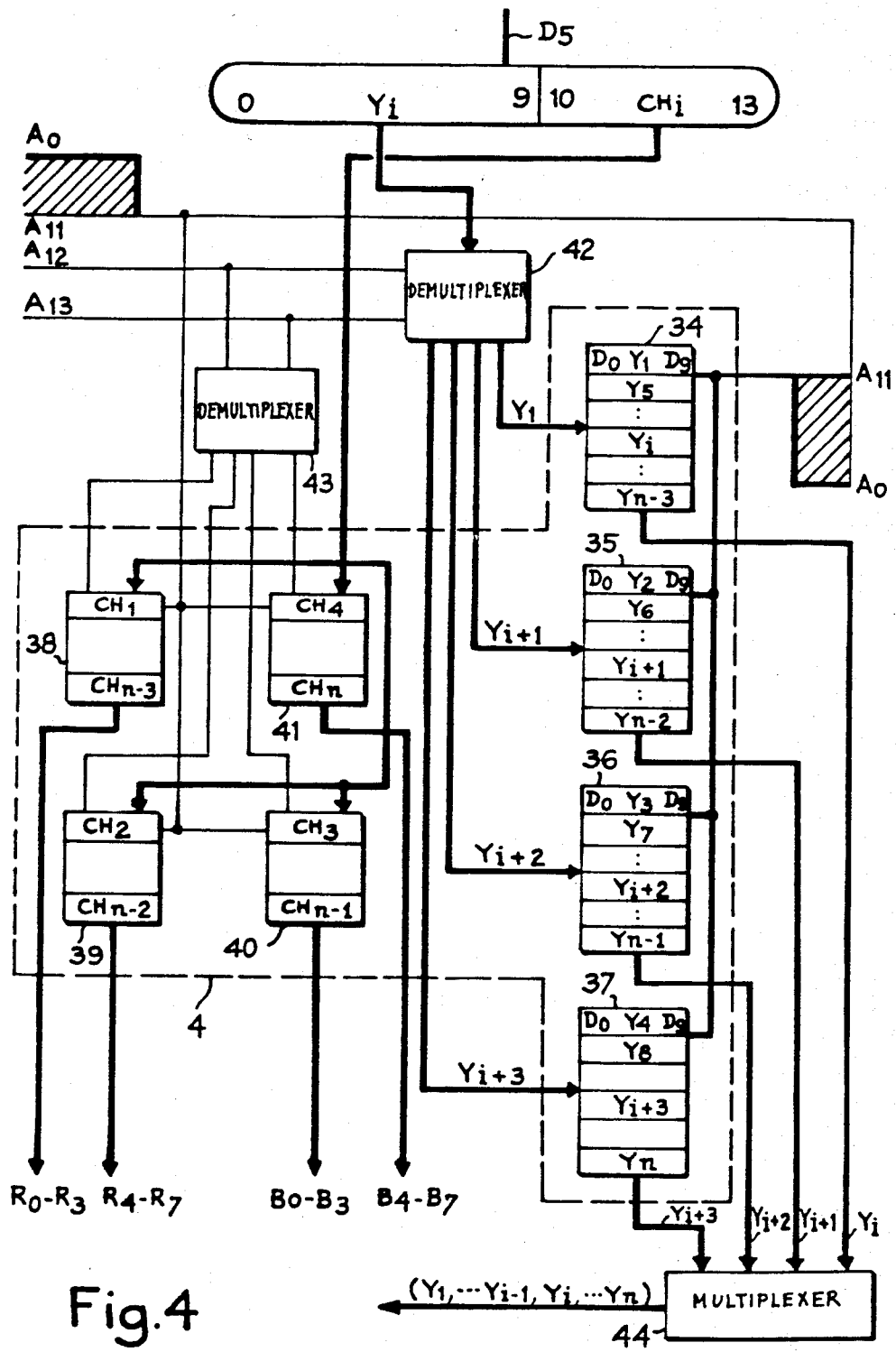
FIG. 4 is a schematic diagram of the circuits for addressing and organization of the read/write memory.

One example of organization of the read/write memory 4 is shown in FIG. 4. The memory 4 is constituted by rapid-access memory circuits such as, for example, CMOS static circuits having a cycle time of approximately 100 nanoseconds. In order to permit their operation at a frequency of 32 MHz which corresponds to transmission of 2048 samples per television line, these circuits are write-demultiplexed and read-multiplexed by four in order to make the multiplexing operation transparent for the user.

In one possible example of construction, the 4-kilobit circuits can be employed, thus making it possible as a result of multiplexing by four to retain a complete set of eight test signals in each circuit. In this case, forty circuits are necessary for storage of the luminance samples which are coded in ten bits, and sixteen circuits are necessary for storage of the two chrominance samples. In the example of FIG. 4, the memory 4 contains four memory blocks 34 to 37 for storage of the luminance signals Y1 to YN and four memory blocks 38 to 41 for storage of the chrominance signals CH1 to CHN. The memories 34 to 37 are divided into ten-bit words each representing one luminance sample whilst the memories 38 to 41 are divided into four-bit words each representing one chrominance sample. Each ten-bit or four-bit word contained in one of the memories 34 to 41 is addressed via the leads A0 to A11 of the address bus A/BUS. The luminance words d0 to d9 and the chrominance words d10 to d13 which are transmitted over the bus D5 are applied respectively on the one hand to the input of a demultiplexer 42 and on the other hand to the input of a demultiplexer 43. The demultiplexer 42 switches the sequence Y1 to YN of the luminance words consisting of the bits d0 to d9 successively into one of the four memory blocks 34 to 37 in order to ensure that the memory 34 contains the words Y1, Y5 . . . Yi Yi+4 . . . YN−3, that the memory 35 contains the words Y2, Y6 . . . Yi+1, Yi+5, YN−2, that the memory 36 contains the words Y3, Y7 . . . Yi+2, Yi+6 . . . YN−1 and that the memory 37 contains the words Y4, Y8, . . . Yi+3, Yi+7 . . . YN. The demultiplexer 43 switches the chrominance words CH (d10 to d13) into one of the four memory blocks 38 to 41 cyclically, beginning with the memories 38 and ending with the memory 41.

Switching of the data on the one hand into each of the memory blocks 34 to 37 and on the other hand into each of the blocks 38 to 41 is controlled by means of the address leads A12, A13 of the address bus A/BUS which are connected to the control inputs of the demultiplexers 42 and 43. The luminance words are read through the multiplexer 44 and this latter delivers at its output the luminance words Y1 to YN which are transferred to the converter 9 when they are read successively in the memory blocks 34 to 37. The chrominance words which are read in the blocks 38 to 41 are applied respectively to the lines R0–R3, R4–R7 and B0–B3, B4–B7 and directed to the converter 9.

Figure 5:
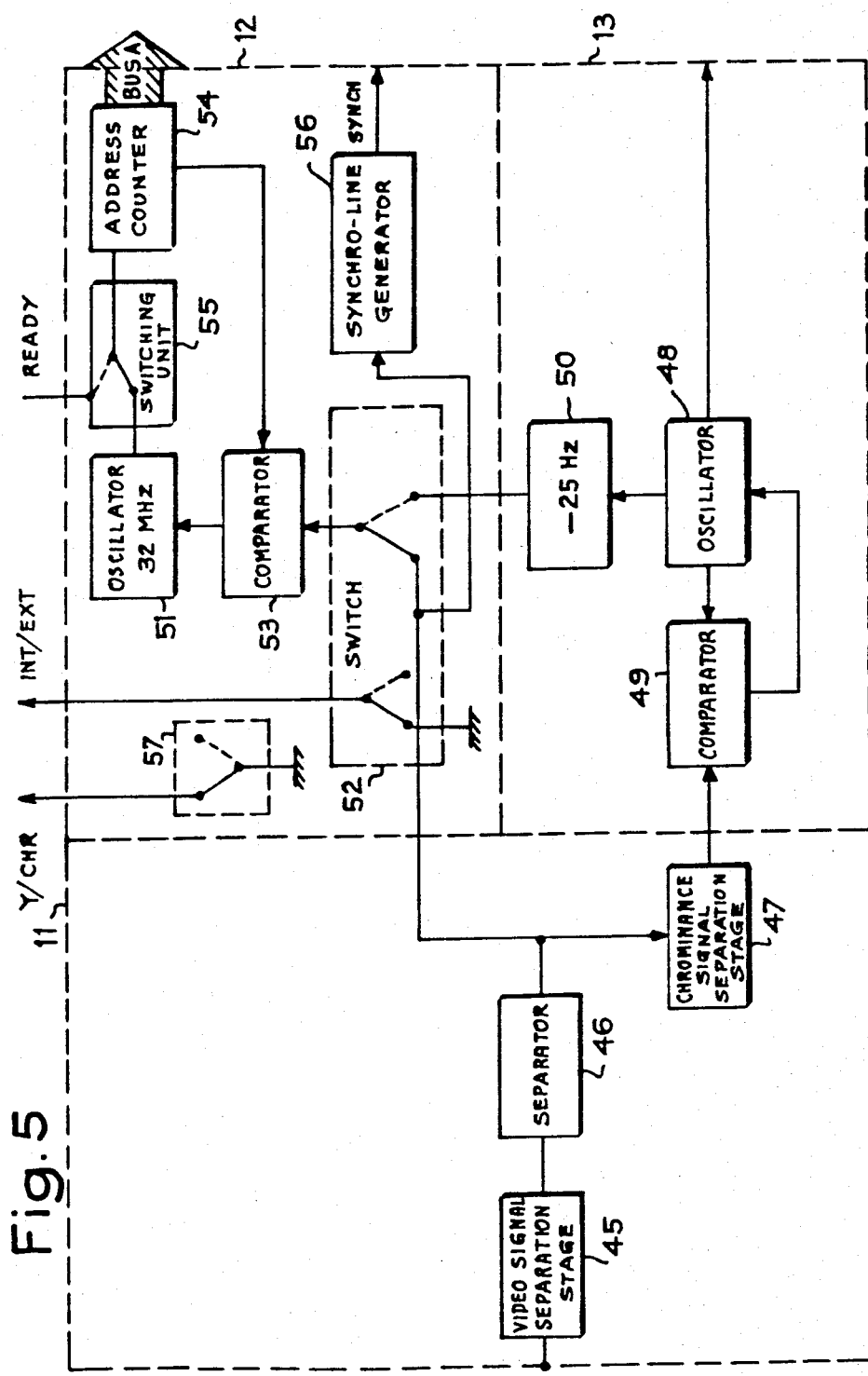
FIG. 5 is a schematic presentation showing the synchronization means.

FIG. 5 is a schematic diagram showing one form of construction of the synchronization means.

The synchronization means have the design function of regenerating the ordinary synchronizing ("Sync") luminance signals and PAL-system ("PAL-S") chrominance signals of the television signals. These synchronization means can in turn be synchronized by means of an external television-signal generator located, for example, in a television station or else they can operate solely in the internal mode in synchronism with an internal clock.

When the test-signal generating device is supplied by an external television-signal generator, the generator applies a television signal to the input of the synchronizing generator 11. The synchronizing generator 11 comprises a video signal separation stage 45, the input of which receives the television signal and the output of which delivers synchronizing pulses to the separator 46. Said synchronizing generator also comprises a chrominance signal separation stage 47, the input of which is coupled to the output of the synchronizing separator 46. The output of the separator 46 supplies the input of the standard PAL-system synchronizing signal generator 13 which is composed in a known manner of an oscillator comprising an oscillating circuit 48 and a comparator 49 which delivers a control voltage for adjusting the frequency of the oscillator when a divergence is detected between the frequency of the oscillator and the frequency of the signals delivered by the chrominance signal separator 47. The frequency of the oscillator 48 is subjected to a 25-cycle shift by a frequency subtracter 50 which receives on its input the frequency of the PAL television standard delivered by the oscillator 48.

The synchronizing signal generator 12 is constituted by an oscillator 51 having an operating frequency of 32 MHz which is synchronized with the frequency delivered by the synchronizing separator 46 or with the frequency delivered by the frequency subtracter 50. Switching to either of these two frequencies is performed by means of the switch 52 which connects the output of the separator 46 to the input of the comparator 53 in the external operating mode and which connects the output of the subtracter 50 to the input of the comparator 53 in the internal operating mode. The switch 52 also transmits the INT/EXT signal to the interface 6 for controlling the selectors 27 to 30.

The generator 12 also comprises an address counter 54, the outputs of which are connected directly to the address bus A/BUS in order to address the read/write memory 4 and the ROM memory 8. A switching unit 55 controlled by the computer 5 connects the clock input of the counter 55 either to the output of the oscillator 51 or to the output of the input-output interface 6 which transmits the READY signal produced by the computer. The input of a synchro line generator 56 is connected to the output of the separator 46. In this manner, the samples stored in the memory 15 of the computer 5 can be transferred into the read/write memory 4 at the same rate as the READY signal transmitted by the computer and can be read in the read/write memory at the same rate as the 32 MHz signal delivered by the oscillator 51. A switch 57 transmits the Y/CHR signal for selecting luminance and chrominance samples to the interface 6.

The operation of the device which has just been described will now be explained with reference to the flow diagram of FIG. 6. This figure represents the different procedures which the computer 5 is capable of carrying out.

Execution of these procedures takes place in an interactive mode by means of a dialog established between the computer 5 and an operator who is stationed in front of the keyboard 17 and the screen 18.

At stage 58, (SELECT) the computer 5 offers the operator a choice between three types of procedures. A first type of procedure or so-called transfer procedure 59 which can be performed at the stages 60a to 60c makes it possible to carry out either transfers of information (stage 60a) between the central memory 15 of the computer 5 and the read/write memory 4 or transfers of information between the central memory 15 of the computer 5 and the memory of the storage device 1 (stage 60b) or direct information transfers between the read/write memory 4 and the storage means 1 (stage 60c).

Each of the procedures represented in the stages 59 to 60c entails the need to execute input-output instructions which are well known in the present state of the art and therefore do not need to be described in connection with the practical application of the invention.

Figure 6:
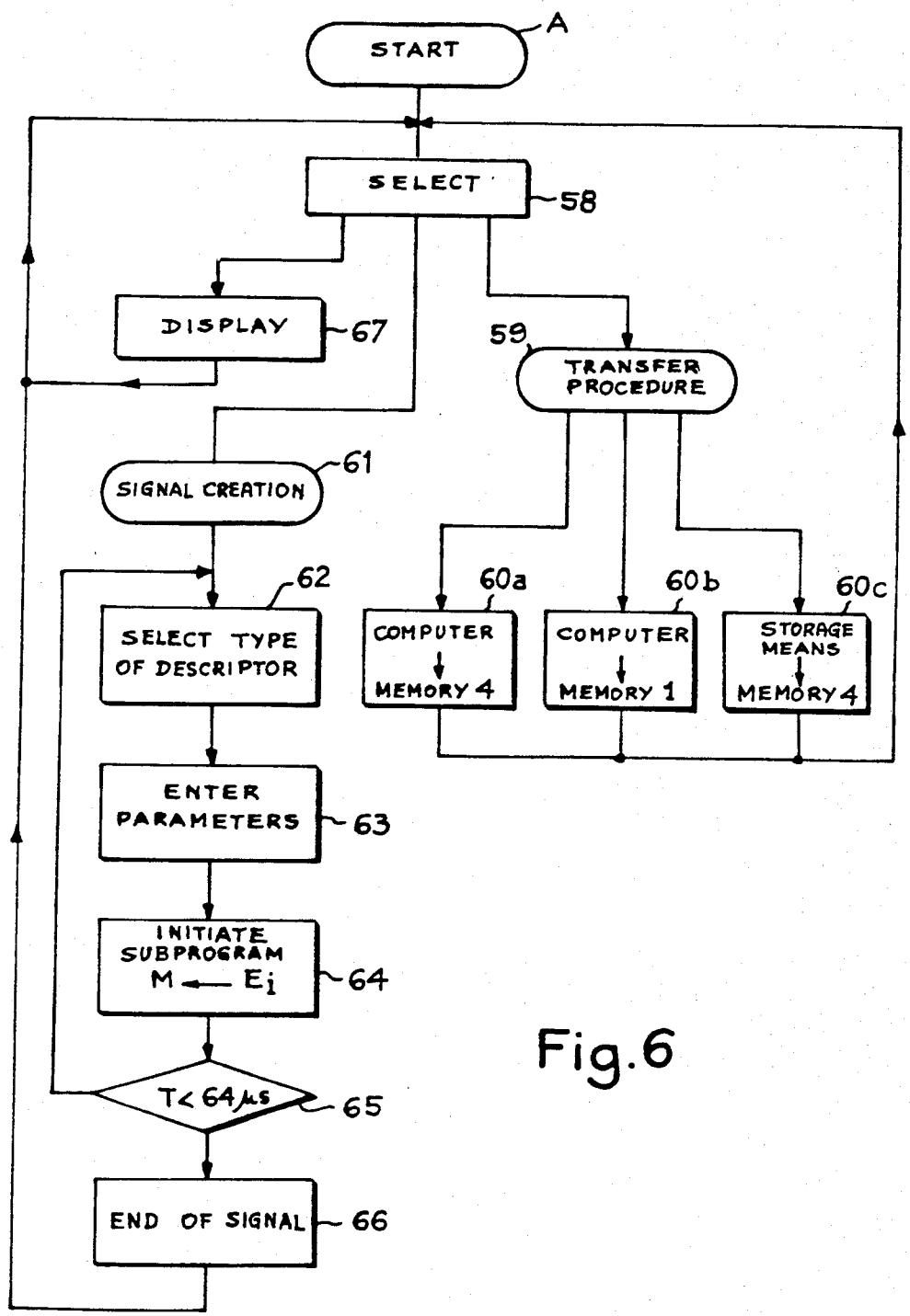
FIG. 6 is a flow diagram showing the general operation of the device.

A second type of procedure or so called "signal creation" (61) is represented by the stages 62 to 66 of FIG. 6. This enables the operator to produce at will a wide range of different signals by associating a number of elementary signals having a predetermined configuration in all possible ways. The configuration of an elementary signal can be represented by means of any mathematical function "y=f(t)" in which "y" represents the amplitude of the signal and f(t) represents a mathematical function of time. By way of example, f(t) can be a constant, a linear function of time, a trigonometric function, and so on. A representative function of an elementary signal is obtained by means of a subprogram which can be stored in the ROM memory 16 of the computer 5 or which can be loaded from the disk memory 7 into the main memory 15 at the moment of execution.

The successive execution of a number of subprograms each corresponding to one function "y=f(t)" accordingly makes it possible to obtain a sequence of elementary signals which succeed each other in time.

The subprogram associated with each elementary signal is addressed from a signal descriptor which supplies the subprogram start address in the ROM memory 16 of the computer as well as the address $AZ_1$ of the data area located in the central memory 15 in which the digital samples of the signal are stored at the time of execution of the subprogram.

Each descriptor is selected at stage 62 by the operator who selects the type of descriptor desired on the keyboard and depresses the corresponding key. At stage 63, the parameters of the signal are introduced into the central memory 15 at the addresses specified by the areas 22 to 24 of the descriptor.

At stage 64, the subprogram addressed by the selected descriptor is initiated.

Figure 7:
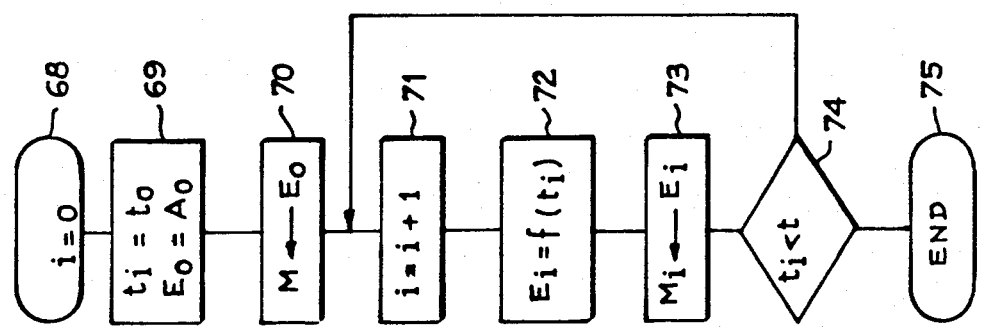
FIG. 7 is a flow diagram representing the organization of a subprogram for the computation of an elementary signal.

A standard flow diagram of a subprogram is shown in FIG. 7. At the outset, at the instant $t=t_o$, during the stages 68 to 70, the amplitude of the first sample $E_o$ is made equal to $A_o$ and the sample $E_o$ is stored at the first address of the data area in central memory which is pointed by the corresponding descriptor. Then at the successive instants $t_i$ defined by the sampling period, the subprogram computes at stages 71 and 72 the amplitude of the samples $E_i$ in accordance with the equation $E_i = f(t_i)$, where f is the mathematical function for obtaining the amplitude of the signal as a function of time. At the stage 73, the computed samples $E_i$ are stored at the successive addresses of the data area reserved for the descriptor. The computing operation stops at the stage 75 when the instant $t_i$ of computation attains the final instant indicated by the address area $AZ_4$ of the descriptor.

Typical examples of starting of subprograms are given below in the case of signal descriptors respectively without any change, with transition or representing frequencies.

| Types | | Remarks |
|---|---|---|
| Descriptor 93 | without change | Input of |
| Old parameters: | Amplitude $A_o$ Time $t_o$ | parameters |
| New parameters: | Time $t = t_1$ | |
| END of test 64 μs | | |
| S/PROG. Where $t_i$ is such that $t_o < t_i < t_1$ | | Execution of subprogram |
| Put $M(i) \leftarrow A_o = E_i$ | | $y = f(t) = A_o$ |
| Descriptor 2: | Transition | Input of |
| Old parameters: | Amplitude $A_o$ Time $t_i = t_1$ | parameters |
| New parameters: | Amplitude A Time $t_i = t_2$ | |
| Test O $A_o + A \leq 700_{mV}$ | | Execution of |
| Test $t_2 \leq 64$ μs | | subprogram |
| S/PROG. Where $t_i$ is such that $t_1 < t_i < t_2$ | | $y = f(t) = A_o - A$ |
| Do $M(i) \leftarrow A_o - A = E_i$ | | |
| Descriptor 3: | Frequency | Input of |
| Old parameters: | Amplitude $A_o - A$ Time $t = t_2$ | parameters mean value |
| New | Frequency F | |

-continued

| Types | | Remarks |
|---|---|---|
| parameters: | Mean value B = 350$_{mV}$ | |
| | Amplitude C = 350$_{mV}$ | |
| | Time t = 64 μs | |
| Test: | if A$_o$ − A ≠ B, effect transition 2ΔT B → 350$_{mV}$ | Execution of subprogram y = B + C sin 2πF · t |
| Test: | Time ≦ 64 μs | |
| Test: | Peak value B + C < 700$_{mV}$ | |
| Test: | 0.5 ≦ F ≦ 12 MHz | |
| S/PROG. | M$_i$ ← E$_i$ = C sin 2 πF · t$_i$ | |

At the end of execution of a subprogram, the procedure refers the operator back to stage 62 in order to ask him to select another signal descriptor.

A number of descriptors may thus be selected as long as the sum of time intervals representing the duration of each elementary signal does not exceed the duration of 64 μs of one scanning line of a television image.

A test is carried out in accordance with the procedure at stage 65 which refers the operator back to stage 66 when the sum of elementary signals exceeds the time interval of 64 μs.

Figure 8:
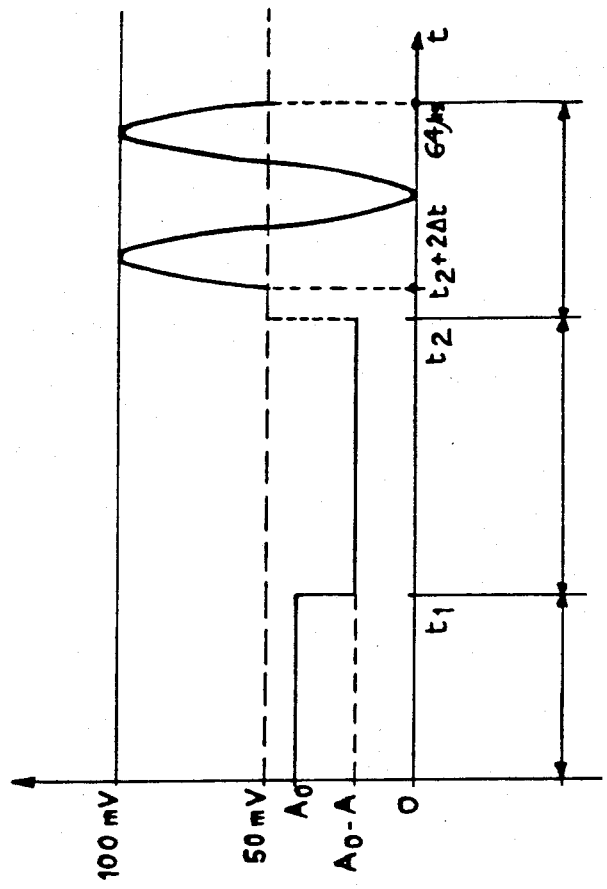
FIG. 8 illustrates one possible waveform of a signal generated by the device.

The signal obtained after selection of the aforementioned descriptors 1, 2 and 3 in that order and after execution of the corresponding subprograms can then be displayed on the screen 18 of the computer (stage 67) in the manner shown in FIG. 8. In this figure, the amplitude of the first elementary signal corresponding to descriptor No 1 is constant and equal to A$_o$ from the instant t=0 to the instant t=t$_1$. The amplitude of the second elementary signal corresponding to descriptor No 2 is also constant but is equal in this case to A$_o$−A from the instant t$_1$ to the instant t$_2$. The signal obtained as a result of execution of the subprogram corresponding to the descriptor 3 is a sine-wave signal having a mean value B at the amplitude 350$_{mV}$ and a peak-to-peak value of 700$_{mV}$.

It is readily apparent that the principle of construction in accordance with the invention makes it possible to obtain a very broad range of different signals either by modifying the order of selection of the descriptors inasmuch as n!=1×2 . . . ×n possible signals can be made to correspond to n descriptors, or by modifying the value of the parameters introduced into each descriptor, or else by altering the choice of mathematical functions representing the different elementary signals. It will be noted that, in all cases, the generation of a new signal does not produce any modification of hardware devices and makes it necessary at the very most to write a fresh subprogram for sampling computation corresponding to the new mathematical function introduced. However, this should not represent any difficulty for those who are well versed in programming techniques.

Although the principles of the present invention have been described above with reference to a particular example of construction, it should be understood that the foregoing description has been given solely by way of example and does not limit either the scope or the spirit of the invention.

What is claimed is:

1. A test-signal generating device for testing electronic equipment and comprising means for storing test signals in the form of digital samples coupled to a digital-to-analog converter for converting the samples stored in digital form to analog signals at the output of the device, wherein said device comprises:
   a read/write memory interposed between the analog-to-digital converter and the storage means;
   a computer coupled to the storage means and to the read/write memory and comprising:
      means for generating test signals in the form of digital samples;
      means for transferring into the read/write memory the signals stored within the storage means and the test signals produced by the generating means;
      as well as means for synchronizing the transfer of samples stored within the read/write memory to the digital-to-analog converter.

2. A device according to claim 1, wherein the means for generating test signals in the form of samples consist of a microprogrammed processing unit.

3. A device according to claim 2, wherein the microprogrammed processing unit, comprises:
   first means for storage of signal descriptors;
   second means for storage of sequences of programmed instructions;
   third means for storage of data for obtaining samples;
   and computation means coupled to said first, second and third means.

4. A device according to claim 3 further comprising a keyboard for addressing said first means for storage of signal descriptors.

5. A device according to claim 4, wherein the signal descriptor storage means comprise in the case of each descriptor an area which indicates the type of descriptor, an area for storing the address of the start of the instruction sequence for obtaining samples corresponding to said descriptor, address areas forming part of operational areas for storing parameters relating to the signal in the data storage means and an address area for the start of an area for storing samples in said storage means.

6. A device according to claim 5, wherein the operational area for storing the parameters comprises:
   an area for storing a parameter which gives the instant of starting of the first signal sample;
   an area for storing a parameter which gives the amplitude of the last sample;
   and an area for storing the instant of generation of the last sample.

7. A device according to claim 6, wherein the read/write memory is addressed by an address counter controlled by the computer for writing samples in the read/write memory and controlled by the synchronization means for reading samples in said read/write memory.

8. A device according to claim 7, wherein said device further comprises demultiplexing circuits for writing samples in the read/write memory and multiplexing circuits for transferring samples from the read/write memory to the digital-to-analog converter.

9. A device according to claim 8, wherein the demultiplexing circuits are controlled by the computer.

10. A device according to claim 9, wherein the multiplexing circuits are controlled by the synchronization means.

* * * * *